US012205292B2

(12) United States Patent
Cheng et al.

(10) Patent No.: US 12,205,292 B2
(45) Date of Patent: Jan. 21, 2025

(54) METHODS AND SYSTEMS FOR SEMANTIC SEGMENTATION OF A POINT CLOUD

(71) Applicant: Huawei Technologies Co., Ltd., Shenzhen (CN)

(72) Inventors: Ran Cheng, Markham (CA); Ryan Razani, North York (CA); Bingbing Liu, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 461 days.

(21) Appl. No.: 17/378,155

(22) Filed: Jul. 16, 2021

(65) Prior Publication Data

US 2023/0035475 A1 Feb. 2, 2023

(51) Int. Cl.
*G06T 7/11* (2017.01)
*G01S 17/89* (2020.01)
(Continued)

(52) U.S. Cl.
CPC ............... *G06T 7/11* (2017.01); *G01S 17/89* (2013.01); *G01S 17/931* (2020.01); *G06F 18/24* (2023.01);
(Continued)

(58) Field of Classification Search
CPC ............. G06T 7/11; G06T 2207/10028; G06T 2207/20016; G06T 2207/20084;
(Continued)

(56) References Cited

U.S. PATENT DOCUMENTS 10,332,001 B2 * 6/2019 Rippel ................. G06N 3/0455
10,970,518 B1 4/2021 Zhou et al.
(Continued)

FOREIGN PATENT DOCUMENTS

CN 108665496 A 10/2018
CN 111311611 A 6/2020
(Continued)

OTHER PUBLICATIONS

Ivan David, "Method for Determining the Encoder Architecture of a Neural Network", date filed: Jan. 26, 2021, date published: Jul. 27, 2022, English translation of EP 4033402 A1 (Year: 2021).*
(Continued)

*Primary Examiner* — Manav Seth
(74) *Attorney, Agent, or Firm* — Slater Matsil, LLP

(57) ABSTRACT

Systems, methods and apparatus for sematic segmentation of 3D point clouds using deep neural networks. The deep neural network generally has two primary subsystems: a multi-branch cascaded subnetwork that includes an encoder and a decoder, and is configured to receive a sparse 3D point cloud, and capture and fuse spatial feature information in the sparse 3D point cloud at multiple scales and multi hierarchical levels; and a spatial feature transformer subnetwork that is configured to transform the cascaded features generated by the multi-branch cascaded subnetwork and fuse these scaled features using a shared decoder attention framework to assist in the prediction of sematic classes for the sparse 3D point cloud.

20 Claims, 7 Drawing Sheets

(51) Int. Cl.
  *G01S 17/931*   (2020.01)
  *G06F 18/24*   (2023.01)
  *G06F 18/25*   (2023.01)

(52) U.S. Cl.
  CPC .. *G06F 18/253* (2023.01); *G06T 2207/10028* (2013.01); *G06T 2207/20016* (2013.01); *G06T 2207/20084* (2013.01)

(58) Field of Classification Search
  CPC . G06T 2207/20081; G06T 7/10; G06T 17/00; G06T 2207/10044; G06T 2200/04; G06T 7/00; G06T 3/4046; G01S 17/89; G01S 17/931; G06F 18/24; G06F 18/253; G06F 18/214–2155; G06F 7/023; G06F 40/16; G06V 10/82; G06V 10/70; G06V 10/774–7796; G06V 20/64; G06V 10/764; G06V 10/7625; G06K 9/6256; G06K 9/6257; G06K 9/6259; G06N 3/02–126; G06N 20/00–20
  See application file for complete search history.

(56) References Cited

U.S. PATENT DOCUMENTS

| | | | | |
|---|---|---|---|---|
| 12,079,970 | B2* | 9/2024 | Cheng | G06F 18/2163 |
| 2019/0096125 | A1* | 3/2019 | Schulter | G06T 7/50 |
| 2020/0349697 | A1* | 11/2020 | Gao | G06V 10/82 |
| 2021/0042557 | A1* | 2/2021 | Roy | G06V 10/143 |
| 2021/0082181 | A1 | 3/2021 | Shi et al. | |
| 2022/0164923 | A1* | 5/2022 | Lee | G06T 5/003 |
| 2022/0196798 | A1* | 6/2022 | Chen | G01S 13/89 |
| 2022/0318557 | A1* | 10/2022 | Mohseni | G06F 18/2415 |
| 2024/0296605 | A1* | 9/2024 | Kozlov | G06T 3/4046 |

FOREIGN PATENT DOCUMENTS

| | | | | |
|---|---|---|---|---|
| EP | 4012649 A1 | * | 6/2022 | |
| EP | 4033402 A1 | * | 7/2022 | |
| GB | 2602255 A | * | 6/2022 | G06T 13/40 |
| WO | WO-2022045495 A1 | * | 3/2022 | G06K 9/46 |

OTHER PUBLICATIONS

Wang Robin, "Optical Method", date filed:Dec. 11, 2020, date published: Jun. 15, 2022, English translation of EP 4012649 A1 (Year: 2020).*

Mehdi Bahri, "Method Of Generating A Latent Vector", date filed Dec. 15, 2020, date published: 2022-06-39, English translation of GB 2602255 A (Year: 2020).*

Feng, Guang et al. "Encoder Fusion Network with Co-Attention Embedding for Referring Image Segmentation." 2021 IEEE/CVF Conference on Computer Vision and Pattern Recognition (CVPR) (2021): 15501-15510 (Year: 2021).*

Choy et al., "4D Spatio-Temporal ConvNets: Minkowski Convolutional Neural Networks," Proceedings of the IEEE/CVF Conference on Computer Vision and Pattern Recognition (CVPR), 2019, pp. 3075-3084.

Poudel et al., "Fast-SCNN: Fast Semantic Segmentation Network," arXiv:1902.04502v1 [cs.CV], Feb. 12, 2019, retrieved online: https://arxiv.org/pdf/1902.04502.pdf.

Zhu et al., "Two-branch encoding and iterative attention decoding network for semantic segmentation," Neural Computing and Applications, Sep. 1, 2020.

Yu et al., "BiSeNet V2: Bilateral Network with Guided Aggregation for Real-time Semantic Segmentation," arXiv:2004.02147 [cs.CV], Apr. 5, 2020, retrieved online: https://arxiv.org/abs/2004.02147.

Choy, "High-dimensional convolutional neural networks for 3D perception," Stanford University, Mar. 2020, retrieved online: http://purl.stanford.edu/fg022dx0979.

* cited by examiner

METHODS AND SYSTEMS FOR SEMANTIC SEGMENTATION OF A POINT CLOUD

TECHNICAL FIELD

The present disclosure generally relates to machine vision methods and systems. More specifically, the present disclosure relates to methods and systems for semantic segmentation of a point cloud.

BACKGROUND

With the advancement of technology, 3D scenes—also referred to as 3D environment—can be captured using detection and ranging (DAR) sensors, such as scanning light detection and ranging (LiDAR) sensors. Currently, 3D scenes that are captured using DAR sensors, such as LiDAR sensors, are represented by sparse 3D point clouds. The processing of sparse 3D point clouds to recognize and understand 3D scenes has proven challenging. Unlike low-dimensional 2D images, 3D point clouds lack color feature information, are sparse, and have the property of varying density, where a region near the LiDAR sensor has much greater density (i.e. the 3D point has many more points) than a region distant to the LiDAR sensor. This has made it difficult for conventional methods of processing 2D images to perform semantic segmentation processing of sparse 3D point clouds. However, 3D point clouds are informative and their precise geometric features can still be exploited to play a role in scene understanding.

SUMMARY

The following summary is intended to introduce the reader to the more detailed description that follows, and not to define or limit the claimed subject matter.

The present disclosure generally relates to methods and systems for semantic segmentation of a three-dimensional point cloud using a deep neural network.

Existing approaches for processing sparse 3D point cloud data tend to have difficulty with point-to-point multiplication of features of different scales, requiring a re-sampling process that introduces noise that may overwhelm the desired detail information at a point. Additionally, geometric features alone can be very ambiguous, since the local features of many objects are similar (e.g., tree trunk vs. utility pole, fence vs. building wall, etc.). In contrast, the present disclosure provides, inter alia, technical advantages associated with semantic segmentation of a three-dimensional point cloud using a deep neural network having a novel architecture that involves sparse convolutional processing at multiple scales, with fusion of features in cascading scales.

According to one aspect of the present disclosure, there is provided a method for semantic segmentation of a 3D point cloud, the method comprising: processing a 3D point cloud to produce a sparse tensor; feed the sparse tensor to each of a plurality of branches of an encoder of a neural network to produce a plurality of branch feature maps, the plurality of branches numbering n, each ith branch respectively comprising i encoder blocks, to produce a respective branch feature map; feed the plurality of branch feature maps into a plurality of hierarchical attention blocks to generate a plurality of emphasized feature maps, wherein, for each pth branch of the 2nd to nth branches, the pth branch feature map and the (p−1)th emphasized feature map are fed to a corresponding (p−1)th hierarchical attention block, and wherein the first branch feature map is fed to the first hierarchical attention block; feed each emphasized feature map output by the plurality of hierarchical attention blocks to a spatial feature transformer to fuse each emphasized feature map of the plurality of hierarchical attention blocks and generate a fused feature map; process the fused feature map and a final decoder block of a decoder to predict a class label for a plurality of points in the 3D point cloud.

In some examples, processing the 3D point cloud to produce the sparse tensor is obtained by pre-processing the 3D point cloud to generate a voxel representation of the 3D point cloud.

In some examples, the sparse tensor comprises for each point in the point cloud, a set of coordinates and one or more associated features corresponding to the set of coordinates.

In some examples, each set of coordinates is contained within a coordinate matrix, wherein the one or more associated features are contained within a feature matrix.

In some cases, the method further comprises feeding the emphasized feature map output by the (n−1)th hierarchical attention block to a first decoder block.

In some examples, the first decoder block is first of n decoder blocks.

In some cases, the method further comprises feeding (n−1) encoder-decoder skip connection outputs from a first through (n−1)th encoder blocks of the n encoder blocks to the n decoder blocks, wherein the (n−1) encoder-decoder skip connection outputs are fed to the n decoder blocks by reverse order of respective depth.

In some examples, processing the fused feature map comprises feeding the fused feature map to the nth decoder block.

In some cases, the method further comprises fusing the fused feature map, an output of the (n−1)th decoder block and the output of the first encoder blocks, wherein the fusing comprises concatenation followed by a convolution operation.

In some cases, the method further comprises scaling each emphasized feature map output by the plurality of hierarchical attention blocks to a common scale, prior to obtaining the fused feature map.

In some cases, the method further comprises assigning a weight to each of a plurality of channels, the plurality of channels corresponding to each output of the plurality of hierarchical attention blocks, prior to obtaining the fused feature map.

In some examples, a kernel size of the the n encoder blocks decreases with increasing number of encoder blocks.

In some examples, the kernel size of each encoder block is given according to:

$$K = \left\lfloor \frac{N+2-p}{2^M} \right\rfloor + 3$$

wherein K is the kernel size, N is the number of the plurality of branches, and M is block depth, and $\lfloor \ \rfloor$ is a floor operation that rounds a value of $$\frac{N+2-p}{2^M}$$

to a nearest integer value.

In some examples, for a first hierarchical attention block of the plurality of hierarchical attention blocks, the first hierarchical attention block comprises first and second convolutional operations.

In some examples, when the (p−1)th and the pth branch feature maps are fed to the corresponding (p−1)th hierarchical attention block, the pth branch feature map is fed to the second convolutional operation.

In some examples, when the (p−1)th and the pth branch feature maps are fed to the corresponding (p−1)th hierarchical attention block, the (p−1)th branch feature map is fed to the first convolutional operation.

In some examples, when the (p−1)th and the pth branch feature maps are fed to the corresponding (p−1)th hierarchical attention block, the pth branch feature map is upsampled and fed to the first convolutional operation.

In some examples, when the (p−1)th and the pth branch feature maps are fed to the corresponding the (p−1)th hierarchical attention block, the (p−1)th branch feature map is downsampled and fed to the second convolutional operation.

In some cases, the method further comprises adding a first and second output from the first and second convolutional operation, respectively, to obtain the emphasized feature map from the hierarchical attention block.

In some examples, the plurality of hierarchical attention blocks numbers at least (n−1).

In some examples, fusing each emphasized feature map from the plurality of hierarchical attention blocks comprises using a shared decoder attention subnetwork.

In some examples, the classified tensor identifies the class labels of the plurality of points in the 3D point cloud. In some examples, the three-dimensional space is a physical space. In some examples, the features comprise a point intensity. In some examples, the features comprise a point range. In some examples, the 3D point cloud is received from a LiDAR sensor.

In some examples, n is an integer greater than or equal to 3. In some examples, n is 4.

According to another aspect of the present disclosure, there is provided an apparatus for semantic segmentation of a 3D point cloud, the apparatus comprising: a memory storing executable program instructions, the executable program instructions for implementing a neural network; and a processor, the processor configured to execute the executable program instructions.

In some cases, the neural network comprises a branched encoder network, a cascading hierarchical attention network, a spatial feature transformer, and a decoder network.

According to another aspect of the present disclosure, there is provided an apparatus for semantic segmentation of a 3D point cloud, the apparatus comprising: a memory storing executable program instructions, the executable program instructions for implementing a neural network; and a processor configured to execute the program instructions to: process a 3D point cloud to produce a first sparse tensor; process the first sparse tensor in each of a plurality of branches of an encoder of a neural network, the plurality of branches numbering n, each ith branch respectively comprising i encoder blocks, to produce a plurality of branch feature maps; process the plurality of feature maps in a plurality of hierarchical attention blocks to generate a plurality of emphasized feature maps, wherein, for each pth branch of the 2nd to nth branches, the pth branch feature map and the (p−1)th emphasized feature map are fed to a corresponding (p−1)th hierarchical attention block, and wherein the first branch feature map is fed to the first hierarchical attention block; process each emphasized feature map output by the plurality of hierarchical attention blocks in a spatial feature transformer to fuse each emphasized feature map of the plurality of hierarchical attention blocks and generate a fused feature map; process the fused feature map and a final decoder block to predict a label for a plurality of points in the 3D point cloud.

In some cases, the processor is further configured to: identify an object in the 3D point cloud, determine a control action based on a position of the object in the 3D point cloud, and transmit a control input to the control device.

According to another aspect of the present disclosure, there is provided a non-transitory computer readable medium storing executable instructions which, when executed by a computer, cause a processor of the computer to perform a method as described herein.

BRIEF DESCRIPTION OF THE DRAWINGS

In order that the claimed subject matter may be more fully understood, reference will be made to the accompanying drawings, in which:

DETAILED DESCRIPTION

Figure 1:
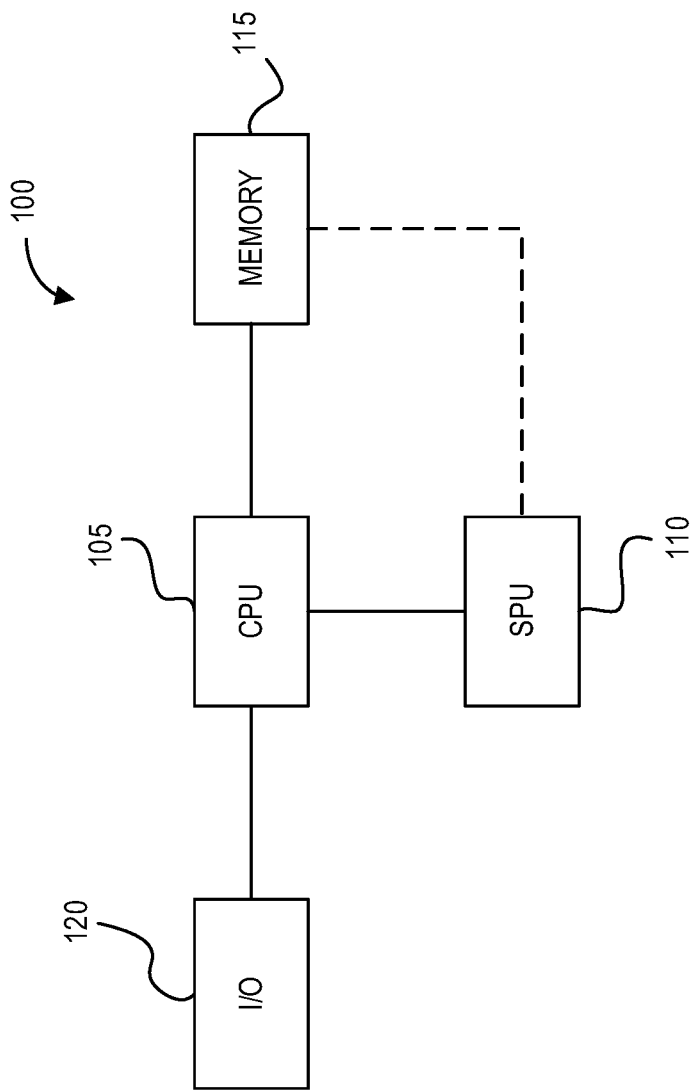
FIG. 1 is a simplified block diagram of a computer system in accordance with the present disclosure.

It will be appreciated that, for simplicity and clarity of illustration, where considered appropriate, reference numerals may be repeated among the figures to indicate corresponding or analogous elements or steps. Numerous specific details are set forth in order to provide a thorough understanding of the exemplary embodiments of the subject matter described herein.

However, it will be understood by those of ordinary skill in the art that the embodiments described herein may be practiced without these specific details. In other instances, well-known methods, procedures and components have not been described in detail so as not to obscure the present subject matter. Furthermore, this description is not to be considered as limiting the scope of the subject matter in any way but rather as illustrating the various embodiments.

As used herein, an "executable file", "executable program" or "executable" is defined as a file that can cause a computing device to perform indicated tasks according to encoded instructions.

Various apparatus or processes will be described below to provide an example of one or more embodiments. No embodiment described below limits any claimed embodiment and any claimed embodiment may cover processes or apparatus that differ from those described below. The claimed embodiments are not limited to apparatus or processes having all of the features of any one apparatus or process described below or to features common to multiple or all of the apparatus described below. It is possible that an apparatus or process described below is not an embodiment of any claimed embodiment. Any embodiment disclosed below that is not claimed in this document may be the subject matter of another protective instrument, for example, a continuing patent application, and the applicants, inventors or owners do not intend to abandon, disclaim or dedicate to the public any such embodiment by its disclosure in this document.

The terms "an embodiment," "embodiment," "embodiments," "the embodiment," "the embodiments," "one or more embodiments," "some embodiments," and "one embodiment" mean "one or more (but not all) embodiments of the subject matter described in accordance with the teachings herein," unless expressly specified otherwise.

The terms "including," "comprising" and variations thereof mean "including but not limited to", unless expressly specified otherwise. A listing of items does not imply that any or all of the items are mutually exclusive, unless expressly specified otherwise. In addition, the terms "a," "an" and "the" mean "one or more," unless expressly specified otherwise.

Further, although processes, methods, and the like may be described (in the disclosure and/or in the claims) having acts in a certain order, such processes and methods may be configured to work in alternate orders while still having utility. In other words, any sequence or order of actions that may be described does not necessarily indicate a requirement that the acts be performed in that order. The acts of processes and methods described herein may be performed in any order that is practical and has utility. Further, some actions may be performed simultaneously, if possible, while others may be optional, if possible.

When a single device or article is described herein, it may be possible that more than one device/article (whether or not they cooperate) may be used in place of a single device/article. Similarly, where more than one device or article is described herein (whether or not they cooperate), it may be possible that a single device/article may be used in place of the more than one device or article.

The term "GPU", as used herein, broadly refers to any graphics rendering device, as well as any device that may be capable of both rendering graphics and executing various data computations. This may include, but is not limited to discrete GPU integrated circuits, field-programmable gate arrays (FPGAs), application-specific integrated circuits (ASICs), discrete devices otherwise operable as central processing units, and system-on-a-chip (SoC) implementations. This may also include any graphics rendering device that renders 2D or 3D graphics.

The term "CPU", as used herein, broadly refers to a device with the function or purpose of a central processing unit, independent of specific graphics-rendering capabilities, such as executing programs from system memory. In some implementations, it is possible that a SoC may include both a GPU and a CPU; in which case the SoC may be considered both the GPU and the CPU.

3D point clouds may be encountered particularly in applications that involve detection and ranging sensors, such as scanning and spinning LiDAR, that are used to scan or capture a 3D scene or environment in a physical space. As will be appreciated, a LiDAR sensor determines the range of objects or surfaces from the LiDAR sensor by emitting an electromagnetic wave (e.g., laser) at particular azimuths and polar angles, detecting reflections, and measuring a time of return to the receiver, along with intensity of the reflection.

The detected information can be used to determination coordinates of points in a volume or space representing the 3D scene or environment, thus generating a 3D point cloud. The intensity can also be used to infer certain information about the points, such as the nature of the surface that caused the reflection, and this can be used to inform understanding of the environment, as discussed further herein. The described embodiments are generally applicable to point clouds generated by any suitable mechanism including, but not limited to, radar, photogrammetry, and so forth.

Several methods may be used to pre-process the 3D point clouds, with the most common ones being: cylinder voxelization to reduce the loss of quantization by converting Cartesian coordinates of each point in a 3D point cloud to polar coordinates to generate a voxel representation of the 3D point cloud; and multi-view fusion of different representations of a 3D point cloud to optimize the perception of certain objects by projecting a 3D point cloud into different representations and fusing the different representations together. For example, projecting multiple representations of a 3D point cloud to a 2D bird's-eye view image can improve the detection performance of a deep neural network which performs sematic segmentation on images, but projecting multiple representations of the 3D point cloud into a 2D range map by spherical projection facilitates the detection of roads and buildings using the deep neural network which performs sematic segmentation. Among the above pre-processing methods, cylinder voxelization is for a specific type of 3D point cloud, and may not be suitable for all types of 3D point clouds, e.g., for a type of 3D point cloud that is not necessarily ring shaped. Multi-view fusion of different representations of 3D point clouds and multi-scale fusion of different scales (i.e. resolutions) of a 3D point cloud require significant computing resources.

A unique set of sparse 3D convolutional neural networks have been designed to account for the sparse characteristics of 3D point clouds in order to efficiently capture 3D spatial information while reducing the impact of high-dimensional computing performance degradation. Examples of sparse convolutional neural network tools that are used to process 3D point clouds include the Minkowski Engine (i.e. a software library that includes various functions and classes for building sparse convolutional neural networks and performing related operations), as well as the SpConv and Torch.Sparse software libraries. However, prior attempts at processing sparse 3D point clouds have performed poorly in part because re-sampling of 3D sparse features via interpolation introduces noise that overwhelms the detail information. Due to the lack of accurate feature representations of 3D point clouds, the main feature representation that can be used is the geometric feature representation. However, the geometric feature representation can be ambiguous at the local scale. Usually, the local features of many objects are similar (e.g., tree trunks vs. utility poles, fences vs. walls), making it difficult to determine the specific category of the object without combining larger-scale global information.

The described embodiments generally provide a single, optimized neural network in which multiple perspectives and multiple scales of a 3D point cloud are processed to predict semantic labels for data points in the 3D point cloud. In particular, the described systems and methods employ a unified deep neural network for performing semantic segmentation of sparse 3D point clouds. The deep neural network generally has: 1) a multi-branch encoder configured to receive a sparse 3D point cloud and capture and fuse spatial feature information in the sparse 3D point cloud at multiple cascading scales forming hierarchical levels, and 2)

a spatial feature transformer that is configured to transform the cascaded feature maps generated by the multi-branch encoder and fuse these scaled feature maps using a shared decoder attention block to assist in the prediction of sematic class labels for the points of the sparse 3D point cloud.

Referring now to FIG. 1, there is shown a simplified block diagram of a computer system 100, according to some embodiments.

As shown, the computer system 100 has a CPU 105, a specialized processing unit (SPU) 110, a memory 115 and one or more input/output devices 120. As described in further detail herein, the computer system 100 may be used for processing data, executing neutral networks, as well as performing other data processing operations. For example, computer system 100 may be an apparatus capable of semantic segmentation of a three-dimensional point cloud, having a memory 115 that stores executable program instructions, the executable program instructions for implementing a neural network, and a processor such as CPU 105 and/or SPU 110 configured to execute the executable program instructions to carry out the functions described further herein including, but not limited to, implementing a branched encoder network, a cascading hierarchical attention network, a spatial feature transformer, and a decoder network.

According to at least some embodiments, the computer system 100 may be used to control or monitor the operation of a vehicle such as an automobile, aircraft, marine vessel, or rail transport vehicle, all of which may be autonomous, partially autonomous (e.g., driver/pilot aids) or manually controlled. Although certain examples are provided herein that may refer to vehicular applications, it should be appreciated that the computer system may also be used in other applications which may use semantic segmentation of 3D point clouds, and in particular sparse 3D point clouds, to provide for machine perception of objects (e.g., other vehicles, pedestrians, bicycles, motorcycles, buildings, roads, sidewalks, etc.) in an environment and, in particular, provide for detection of multiple objects and multiple instances of objects within the environment with high confidence. Generally, the described methods, systems and apparatus can be used to process 3D point clouds to perform semantic segmentation to generate semantically labeled 3D point clouds (i.e., 3D point clouds in which each point is associated with an object class label from a set of object class labels) that can be used by downstream systems of an automated driving system (ADS) or advanced driver-assistance (ADAS) of an autonomous or semi-autonomous vehicle for, e.g., path planning, motion planning, trajectory generation, vehicle localization, etc.

CPU 105 may be a general purpose processor that uses, e.g., the x86 or arm instruction sets. In some cases, CPU 105 may be a specialized processor, such as an application-specific integrated circuit, field programmable gate array, or the like. SPU 110 may be graphics processing unit (GPU), neural processing unit (NPU), tensor processing unit (TPU) or other specialized processor. Generally, SPU 110 is a specialized circuit optimized to perform control and arithmetic logic typical of machine learning algorithms including, for example, convolution and matrix multiplication. Memory 115 may include both volatile memory (e.g., random access memory) and non-volatile memory (e.g., flash memory). Input/output devices 120 may include sensors, including LiDAR sensors or radar sensors, imaging sensors (e.g., cameras), and other devices such as keyboards, displays, network interfaces, media reading and writing devices, and so forth.

It will be appreciated that various components of computer system 100 may be integrated into a single unit (e.g., on-chip memory), or distributed among multiple discrete elements. In some embodiments, computer system 100 may consist of one or more computing apparatuses (e.g., physical machines, servers, a cluster of servers, virtual machines instantiated by a cloud computing platform) executing the software as described herein.

CPU 105 may be configured to execute program code stored in a non-volatile portion of memory 115. In operation, CPU 105 may store data and instructions in a volatile portion 115, and read input from non-volatile memory while saving output data to non-volatile memory. Alternatively, CPU 105 may read and write data to and from I/O devices 120, such as sensors or control interfaces.

As described, in at least one embodiment, computer system 100 may be deployed in an autonomous or semi-autonomous vehicle, in which case CPU 105 may execute software programs (e.g., an ADS or an ADAS) to provide for the safe operation of the autonomous or semi-autonomous vehicle. In particular, CPU 105 may execute instructions of a machine vision module (generally referred to as a perception module) of the ADS or ADAS to process data acquired or received from one or more sensors mounted to the vehicle, and which are used for sensing the vehicle's surrounding environment (e.g., point clouds received from radar or LiDAR sensors, images received from imaging sensors) to detect objects such as, roadway features, other vehicles, pedestrians, buildings and obstacles and other hazards in the environment in which the autonomous or semi-autonomous vehicle is operating. CPU 105 may also process data acquired or received from sensors of the vehicle, such as steering wheel input data, acceleration data, and speed data acquired or received from accelerometers, gyroscopes, and an inertial measurement unit (IMU) of the vehicle. CPU 105 processes the sensor data to detect objects and then executes instructions of the ADS or ADAS which makes control decisions, and finally provides inputs to a vehicle controller of the vehicle which generates control signals which are used to control operation of the vehicle (e.g., navigate the vehicle along a trajectory generated by a planning module of the ADS or ADAS by controlling the throttle, the brakes, and the steering angle of the vehicle), or alert a driver of potential hazards or objects of interest. Processing the data acquired or received from sensors may involve, by way of non-limiting example, processing the data using one or more deep neural network as described further herein.

Figure 2:
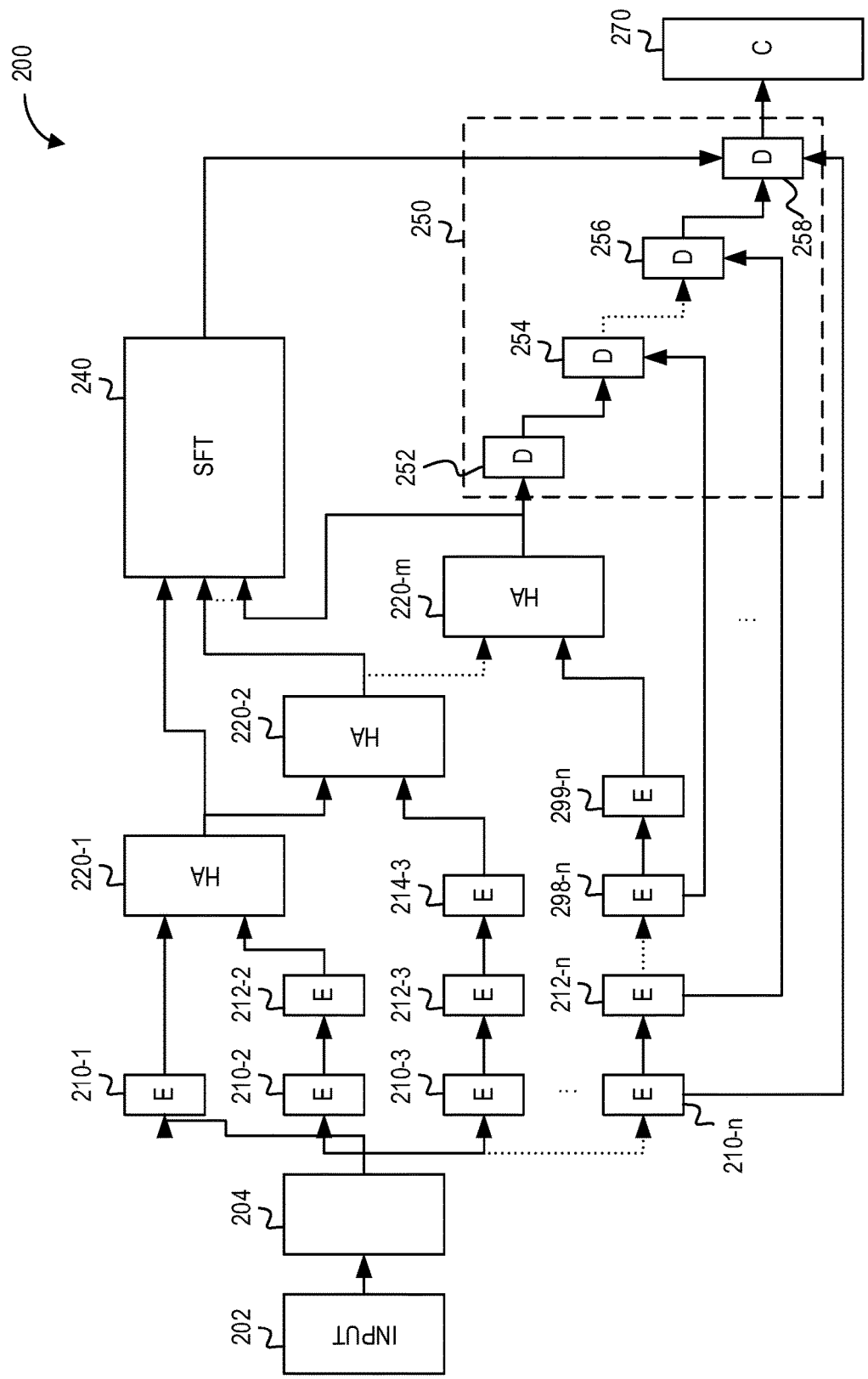
FIG. 2 is a schematic block diagram of a neural network for processing segment information 3D point clouds in accordance with examples disclosed herein.

Referring now to FIG. 2, there is illustrated a schematic block diagram for a neural network for performing sparse semantic segmentation of 3D point clouds in accordance with an embodiment. Neural network 200 is a deep neural network for performing sparse semantic segmentation of 3D point clouds which has a multi-lateral hierarchical structure. Neural network 200 combines multi-scale cascade elements and multi-scale fusion. As described further herein, neural network 200 has a multi-branch encoder, where each branch is composed of a different number of encoder blocks, each representing sparse convolutional layers, and where the number of encoder blocks is generally proportional to the order of the branch. For example, in a four-branch encoder, each successive branch has more encoder blocks than the previous branch, e.g., 1 encoder block representing one sparse convolutional layer for the first branch, 2 encoder blocks representing two sparse convolutional layers for the second branch, 3 encoder blocks representing three sparse convolutional layers for the third branch, and 4 encoder blocks representing four sparse convolutional layers for the fourth branch. The decoder has a single branch with decoder blocks representing transposed sparse convolutional layers (otherwise referred to as sparse deconvolutional layers) corresponding to each layer multi-branch encoder. That is, the number of decoder blocks corresponds to the number of encoder blocks in the longest branch of the multi-branch encoder. This also provides for a skip connection of appropriate scale between each encoder block of the longest branch and a corresponding decoder block.

A hierarchal attention block performs hierarchical cascade fusion according to the number of encoder blocks (sparse convolutional layers), and cascade fusion starts from the encoder branch with the smallest number of encoder blocks (sparse convolutional layers). For example: an encoder branch with 1 sparse convolutional layer will first perform a linear feature fusion with an encoder branch with 2 sparse convolutional layers, and their fusion result will be fused with an encoder branch with 3 sparse convolutional layers, and so on until all encoder branch structures are fused. Linear fusion is the element-wise concatenation of the feature maps of corresponding points in the sparse tensors of the output of the two branches. If a corresponding point is not found, the feature vector is assumed to be 0 for the point, so that the feature information of the original 3D point cloud is not lost. In this way, multi-scale features in the spatial information can be captured and restored more effectively. Furthermore, after all cascading fusions are performed and, the scale of the resulting feature map is made consistent with the scale of the feature map output from the first encoder branch, so that the sparse tensor after the fusion of the feature maps can be directly point-wise feature concatenated with the final decoder block (e.g., decoder block 258 in FIG. 2). Both high-fidelity and global context information can be input to the last layer of the decoder sparse convolutional layer for a final semantic probability prediction.

With the multi-branch and cascade, the dimensionality of the feature vector generally will increase with each additional processing step due to the feature fusion. This may produce a large number of contiguous 0 blocks in the feature vector. When a large number of these 0 blocks accumulate in the diagonal region, the entire sparse tensor feature matrix rank may decrease until it becomes irreversible, which may in turn cause the gradient to disappear (or even the CPU to fail to execute correctly). To overcome this, neural network 200 has a spatial feature transformer 240, which accepts the sparse tensors from each cascaded linear fusion, squeeze reweights—using a channel-wise attention operation—the sparse tensors, and re-projects the entire point-wise feature vector after a column-wise squeeze reweight operation. Squeeze reweighting may also be referred to as normalization.

Accordingly, the original space—corresponding to the original 3D coordinates—is restored, thereby providing for the numerical stability of the feature matrix after cascade fusion. In other words, all features still have the same dimension and same number of feature maps.

Neural network 200 may be executed by computer system 100. Accordingly, neural network 200 may be implemented as software, stored in executable form in memory 115, and executed by CPU 105 and/or SPU 110 to process input data and produce output data. The input data may be received from sensors or retrieved from a memory, and the output data may be stored in a memory, or transmitted to one or more output device.

Neural network 200 accepts input data 202 at input block 204. As noted, input data 202 may be unprocessed 3D point cloud data for a volume, which may be pre-processed to generate a voxel-based representation. It will be appreciated that points in an unprocessed 3D point cloud may be represented in a variety of fashions, however following pre-processing or "voxelization" of the input data 202, the described points are voxel nodal points. In some embodiments, the size of the voxels may correspond to the resolution of the 3D point cloud data, such that there is a one-to-one correspondence between points and voxels. In other embodiments, the voxels may have higher or lower resolution than the raw 3D point cloud data. When using Euclidean geometry with Cartesian coordinates, points are represented in the volume with X, Y and Z coordinates. Likewise, when using different coordinate systems, the points may be represented using alternative coordinates. Points may also have one or more features. In the case of data generated by a LiDAR sensor, points may have intensity and range data. In the case of point cloud data generated via photogrammetry, points may have colour information. Other feature information may also be present.

3D point cloud data has three spatial dimensions representing a physical space. In at least some embodiments, the 3D point cloud may also have an added time dimension, resulting in four total dimensions. In some cases, the described embodiments may process a sequence of 3D point clouds to extract temporal features from the sequence of 3D point clouds (often referred to as point cloud frames). Each 3D point cloud includes a time stamp indicating a time at which the 3D point cloud was generated by a scan of an environment. A network can be trained to learn from features in the sequence of 3D point clouds. In some cases, four dimensions may be represented using Euclidean geometry with the added time dimension, however in at least some embodiments, the coordinates and time are converted into Minkowski space for ease of processing with, e.g., Minkowski Convolutional Neural Networks.

Input block 204 may perform processing of the input data. For example, if the input data 202 is not provided in sparse tensor form, input block 204 may format the input data 202 into a sparse tensor format. A sparse tensor is a set of coordinates $C \in \mathbb{Z}^{N \times D}$ and associated features $F \in \mathbb{R}^{N \times N_F}$ where N is the number of non-zero elements within a sparse tensor, D is the dimension of the space, and $N_F$ is the number of channels. Accordingly, converting the input data 202 into a sparse tensor produces a data structure that includes the coordinates of each point in the voxelized point cloud and the features (e.g., intensity, etc.) of the point. The resultant sparse tensor is the basic building block of sparse convolution as used herein.

Figure 5:
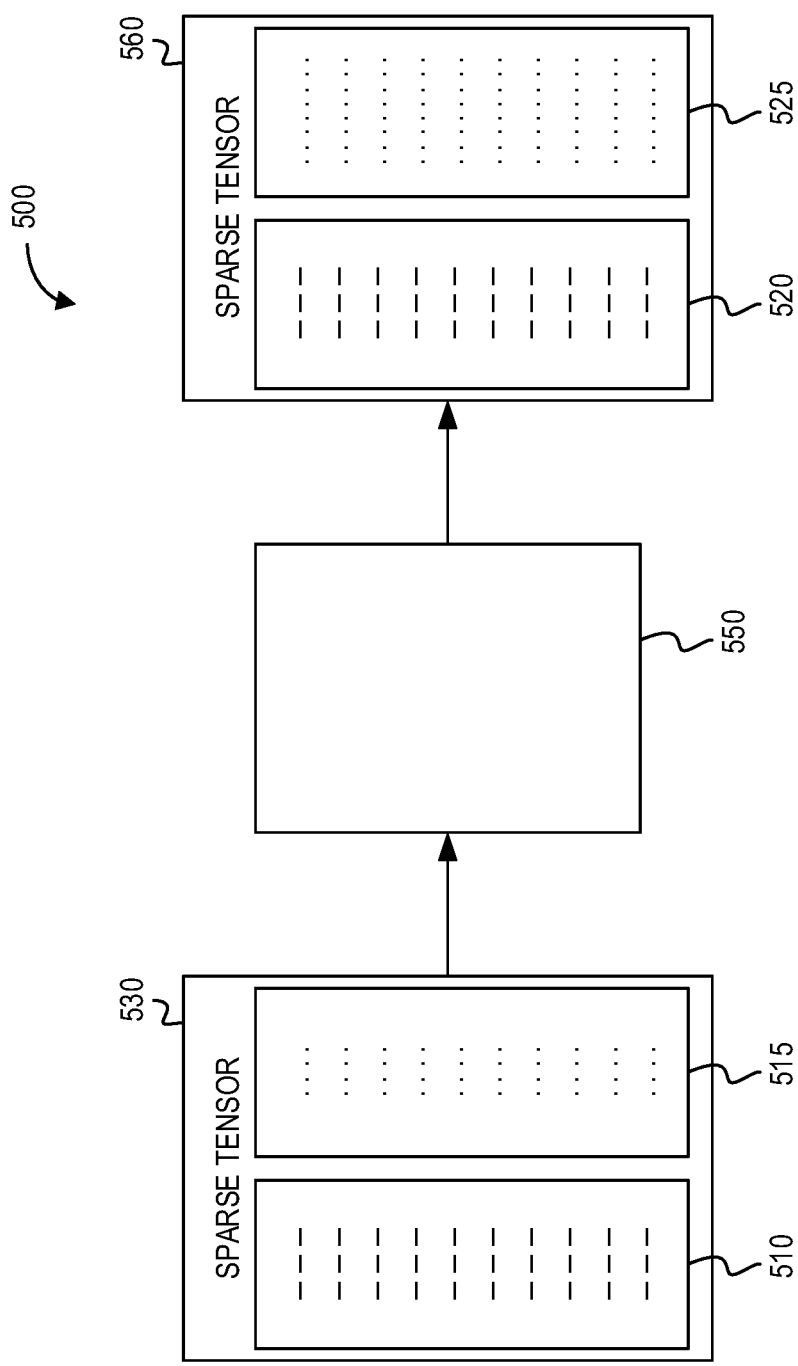
FIG. 5 is an illustration of a sparse convolution operation performed by the deep neural networks of FIG. 2 and FIG. 3.

Sparse convolution is generally analogous to conventional convolution but involves: 1) a neighbor search based on the coordinates of a point to find all neighbor points within a kernel radius, and 2) 1D convolution of the corresponding features of the located neighbor points to generate a new sparse tensor. The new sparse tensor contains more feature information, expressed in the dimension feature of the sparse tensor. An example of this is shown in FIG. 5, which illustrates an example sparse convolution operation performed on an input sparse tensor 530 by a sparse convolution layer 550 to produce an output sparse tensor 560. Input sparse tensor has point coordinates 510, each of which has corresponding feature information 515. Following sparse convolution, output sparse tensor 560 has point coordinates 520, which have feature information 525. Point coordinates 510 and 520 may be the same, i.e., for each point that sparse convolution operation is applied to, the coordinates of the point are maintained in the output sparse tensor.

The new resultant feature information 525 for each point may be considered analogous or equivalent to feature maps or channels in conventional convolutional neural networks. The output of a sparse convolution operation is sometimes referred to as a feature map, feature representation or activation map. These terms may be used interchangeably, however, for consistency, the phrase feature map will be used herein.

The output of input block 204 is a first sparse tensor, which is fed to a plurality of branches of the multi-branch encoder of neural network 200. Each branch begins with an encoder block (or sparse convolutional layer), which can be characterized as attempting to learn meaningful information. In particular, the first sparse tensor is fed to the first encoder blocks 210-1 to 210-n of each branch.

In at least some embodiments, for a given number of branches, N, the number of encoder blocks in each successive branch of the multi-branch encoder will increase, up to N. Generally, N should be greater than or equal to 3.

As previously noted, each branch may have a number of encoder blocks determined by respective order within the branch hierarchy. For instance, the number of encoder blocks for a first branch p=1 can be 1, meaning that branch p=1 has one sparse convolutional layer, e.g., encoder block 210-1. Moving to the next branch p=2, the number of encoder blocks can be 2, meaning that branch p=2 has two sparse convolutional layers, e.g., encoders blocks 210-2 and 212-2. The feature map output by encoder block 210-2 is fed as input to encoder block 212-2. Similarly, for branch p=3, the number of encoder blocks can be 3, meaning that branch p=3 has three sparse convolutional layers, e.g., encoder blocks 210-3, 212-3 and 214-3. Finally, for the last branch p=n, there may ben encoder blocks 210-n to 299-n. As a result of this structure, branches with fewer encoder blocks can be considered as searching for larger or broader features in the input data, whereas branches with more encoder blocks can be considered as searching for progressively smaller or finer features.

In general, the closer an encoder block is to the input, the larger its kernel size will be. In contrast, the further away the encoder block is from the input, the smaller the size of the kernel will be. This enables branches with fewer encoder blocks to capture a larger range of context through a larger kernel at the output of the branch without over-fitting the manifold of the original features. Similarly, in branches with more encoder blocks, a smaller kernel size at the output of the branch can capture and distinguish smaller detailed features. In this way, when the encoder branches are cascaded and merged, they can complement the feature space to achieve better understanding of a scene or environment represented by a 3D point cloud. Furthermore, the use of this cascade fusion makes the scale of the fusion features smoother than direct multi-scale linear fusion, so that the details of the original feature space can be better maintained without being overwhelmed.

The feature maps produced by the final encoder block (i.e., sparse convolutional layer furthest from the input) in each branch (e.g., M=p) may be referred to as the branch feature map.

As a general rule, the kernel size (e.g., filter), K, of each encoder block can be determined based on the branch number, p, and the layer number or depth of the encoder block within its respective branch, M. In one example, the following equation may be used to determine or suggest the kernel size:

$$K = \left\lfloor \frac{N+2-p}{2^M} \right\rfloor + 3$$

where $\lfloor \ \rfloor$ is a floor operation that converts the value of $$\frac{N+2-p}{2^M}$$

to a nearest integer value.

However, in other embodiments, different approaches to determine kernel size may be used.

Neural network 200 has a plurality of hierarchical attention blocks, which may also be referred to as attention blocks. Each hierarchical attention block is fed at least one branch feature map and either the output of a preceding hierarchical attention block or, in the case of the first hierarchical attention block, the first branch feature map. That is, hierarchical attention block 220-1 is fed the branch feature maps output by encoder block 210-1 and encoder block 212-2. Hierarchical attention block 220-2 is fed the emphasized feature map output by hierarchical attention block 220-1 and the branch feature map output by encoder block 214-3. This hierarchical cascade continues until hierarchical attention block 220-m is reached. Consistent with the "broad-to-narrow" progression of each branch, successive hierarchical attention blocks can be considered to focus on progressively narrower or finer features in the input data. For instance, hierarchical attention block 220-1 may focus on large features within the voxelized point cloud (e.g., building), block 220-2 may focus on medium-sized features (e.g., vehicle) and block 320-3 may focus on small-sized features (e.g., traffic control signal). Since each hierarchical attention block is tuned to different sized features, it can identify such features with greater accuracy. Moreover, the output of the hierarchical attention blocks feeds forward to successive hierarchical attention blocks, where it can be used to inform the processing at that level.

Additionally, the emphasized feature maps output by hierarchical attention blocks 220-1 to 220-m are also fed to a spatial feature transformer (SFT) 240. The spatial feature transformer 240 generally serves to fuse different contextual information obtained from different abstract levels to efficiently encode features and help to capture global connectivity. The operation of the SFT is described further herein with reference to FIG. 4B.

The emphasized feature map output by hierarchical attention block 220-m is also input to a decoder block 252, which represents the first sparse deconvolutional layer of decoder 250. Each successive decoder block is fed the decoder feature map output by the preceding decoder block, along with an encoder-decoder skip connection output at the same scale from a corresponding encoder. In particular, decoder block 254 is fed the decoder feature map output by decoder 252 and the skip connection output from encoder block 298-n. Similarly, decoder block 256 is fed the decoder feature map output by decoder block 254 and the encoder-decoder skip connection output from encoder block 212-n, while decoder block 258 is fed the decoder feature map output by decoder block 256 and the encoder-decoder skip connection output from encoder block 210-n. In general, each decoder block can be characterized as attempting to process input information and map it to output features by performing sparse deconvolution using the same kernel as in the corresponding encoder block. For example, the kernel used for sparse convolution in encoder block 210-$n$ corresponds to the kernel for sparse deconvolution in decoder block 258.

The phrase "encoder-decoder skip connection" as used in this context may be considered as residual convolutions wherein the feature map output of the encoder block is used as direct input to a corresponding decoder block.

Decoder block 258 fuses the output of the spatial feature transformer 240, the previous decoder block 256 and the encoder-decoder skip connection from encoder block 210-$n$ and passes its output—a decoded feature map—to a classifier 270 that performs a further sparse convolution to reduce the number of feature channels to the number of target classes (e.g., 20) and thereby generate a decoded sparse tensor with class information or labels for each point. This can be used to create an output point cloud that has semantic segmentation information applied based on the classes. The nature of the class labels may depend on the specific application. For example, in the automotive context, classes may include ground, structure, vehicle, nature, human, object and other classes, which may be further subdivided into, e.g., road, sidewalk, parking, other-ground, and so forth.

In some embodiments, the SFT 240 may be combined with decoder 250, or even considered as one element. In some other embodiments, the SFT 240 may be omitted, leaving only the decoder 250.

For automotive applications, neural network 200 may be trained using the SemanticKITTI dataset available at (http://semantic-kitti.org). Experimentation found that approximately 140 epochs were sufficient to achieve acceptable network performance. Similarly, neural network 200 may be trained using the SemanticPOSS dataset available at (http://www.poss.pku.edu.cn/semanticposs.html), in which case acceptable network performance was achieved after about 50 epochs.

Training may be carried out using forwardpropagation and backpropagation, wherein in at least some embodiments, backpropagation uses a gradient descent optimization with a Weighted Cross Entropy (WCE) loss function.

Figure 3:
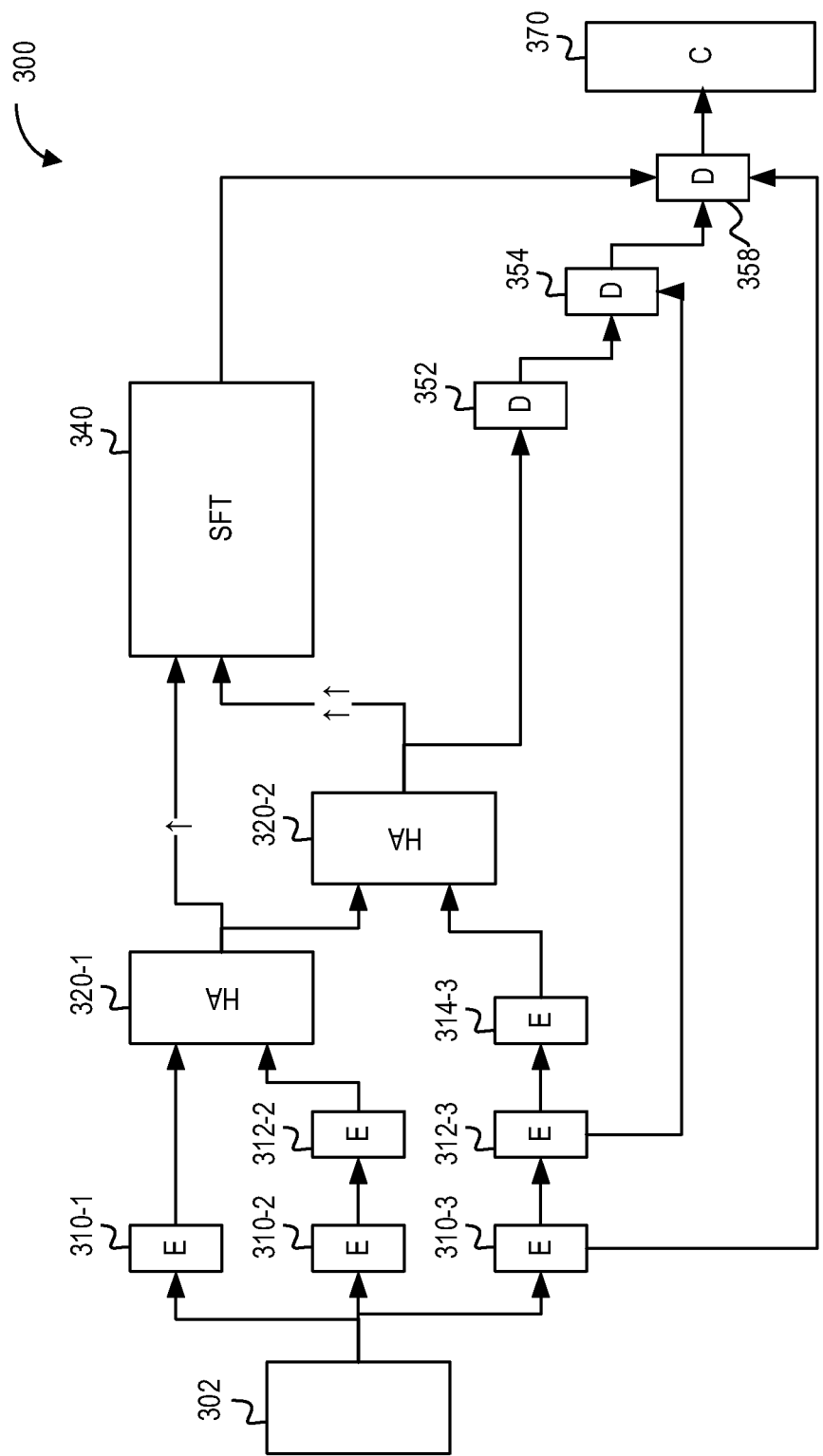
FIG. 3 is a schematic block diagram of a neural network for processing 3D point clouds in accordance with at least one embodiment.

Referring now to FIG. 3, there is illustrated a schematic block diagram for a neural network for processing segment information in accordance with an embodiment. Neural network 300 is generally analogous to neural network 200 with three branches (i.e., N=3), and can be used to process sparse tensor input data 302 generated from an unprocessed 3D point cloud.

Neural network 300 has a three-branch encoder that includes encoder block 310-1 in the first branch, encoder blocks 310-2 and 312-2 in the second branch, and encoder blocks 310-3, 312-3 and 314-3 in the third branch. Outputs of encoder blocks 310-1 and 312-2 feed into hierarchical attention block 320-1, whose output in turn feeds into an input of the hierarchical attention block 320-2, along with an output of the encoder block 314-3. The emphasized feature map output of hierarchical attention block 320-1 is upsampled once and fed into SFT 340, while the emphasized feature map output of hierarchical attention block 320-2 is upsampled twice and fed to SFT 340. The emphasized feature map output by hierarchical attention block 320-2 is also fed to the decoder block 352, which performs a transposed convolution on the emphasized feature output by hierarchical attention block 320-2 to generate and output a feature map. An output of the decoder block 352 feeds into an input of decoder block 354 along with an output of the encoder block 312-3 via a skip connection from encoder block 312-3 to the decoder block 354. An output of decoder block 354 feeds into an input of the decoder block 358 along with the encoder-decoder skip connection from encoder 310-3. Decoder block 358 passes its output sparse tensor to a classifier 370 that processes the features to reduce the number of feature channels to the number of target classes and generates an output sparse tensor with class information or labels for each point.

Figure 4A:
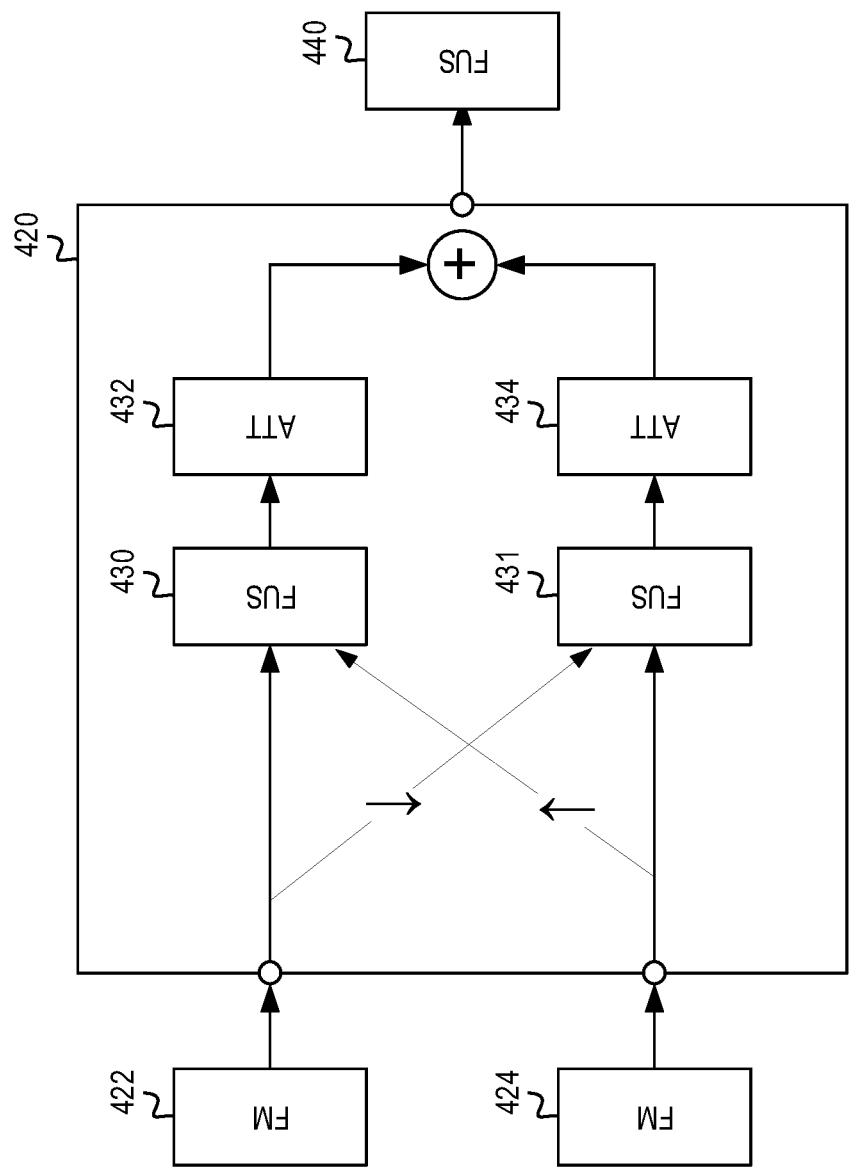
FIG. 4A is a schematic block diagram of a hierarchical attention block of the deep neural networks of FIG. 2 and FIG. 3 in accordance with examples disclosed herein.

Referring now to FIG. 4A, there is illustrated a schematic block diagram for a hierarchical attention block in accordance with at least some embodiments. Hierarchical attention block 420 is an example implementation of the hierarchical attention blocks 220-1 to 220-$m$ of FIG. 2 and hierarchical attention blocks 320-1 to 320-3 of FIG. 3.

Hierarchical attention block 420 performs cascading feature fusion based on features of at two different scales and at two different levels of abstraction. In particular, hierarchical attention block 420 accepts a first input feature map 422 and a second input feature map 424. First input feature map 420 may be a branch feature map output by, e.g., an encoder block such as encoder block 210-1 of FIG. 2, or may be an emphasized feature map output by another hierarchical attention block. Input feature map 424 also is branch feature map output from a subsequent branch, as shown in FIGS. 2 and 3. As input feature maps 422 and 424 are produced from processing by two or more branches, their scale and abstraction levels will differ. For instance, feature map 422 is produced by a first and second encoder branch, or by a hierarchical attention block that fuses the branch feature maps of preceding branches. Feature map 424 is produced by an encoder branch with more encoder blocks (and therefore a smaller kernel size used to generate its branch feature map) than were used in the generation of feature map 424. Feature map 424 is upsampled, linearly fused with feature map 422 by fusion block 430, and the fused feature map is input to a first attention block 432, which produces a first attention feature map. Similarly, feature map 422 is downsampled, linearly fused with feature map 424 by fusion block 431, and the fused feature map is input to a second attention block 434, which produces a second attention feature map. As previously noted, linear fusion involves the element-wise concatenation of the feature vectors of corresponding points in the sparse tensors of the input feature maps. If a corresponding point is not found, the feature vector is assumed to be 0, so that the feature information of the original point cloud is not lost. Attention blocks 432 and 434 implement an attention mechanism, such as Bahdanau Attention or others.

The first and second attention feature maps are fused by adding the respective feature maps at the downsampled scale to produce an emphasized feature map 440 with a scale (otherwise referred to as "resolution") corresponding to feature map 422.

Figure 4B:
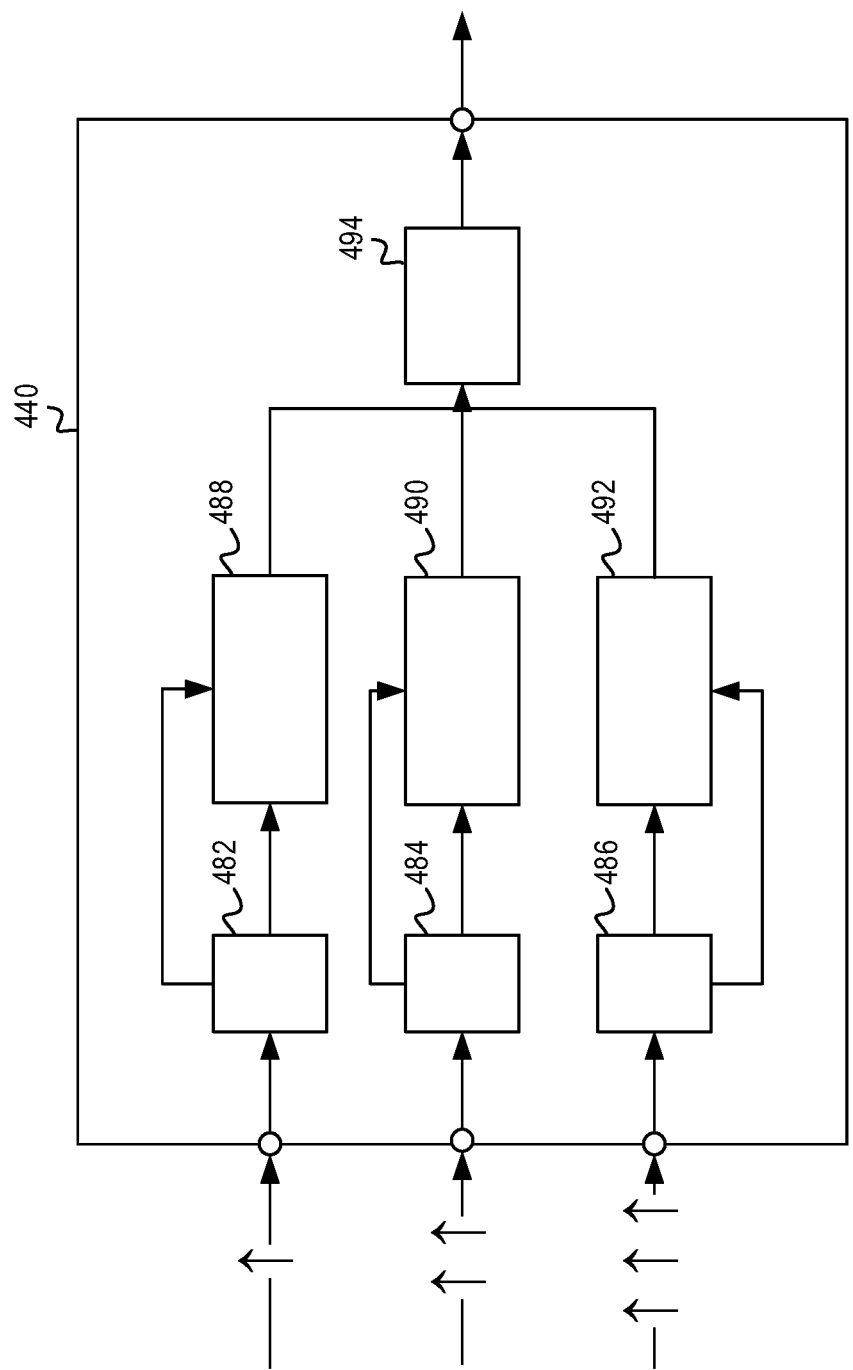
FIG. 4B is a schematic block diagram of a spatial feature transformer of the deep neural networks of FIG. 2 and FIG. 3 in accordance with examples disclosed herein.

Referring now to FIG. 4B, there is illustrated a schematic block diagram of a spatial feature transformer in accordance with at least some embodiments. Spatial feature transformer 440 is an example implementation of the spatial feature transformer 240 of FIG. 2 and spatial feature transformer 340 of FIG. 3.

Spatial feature transformer 440 receives upsampled emphasized feature maps as inputs and applies further attention to then produce a fused feature map. The fused feature map can be further fused with the output feature map of a decoder, such as decoder 258 of decoder 250.

To obtain a common scale, the emphasized feature map produced by each hierarchical attention network (e.g., hierarchical attention block 240, 340, 440), is first upsampled an appropriate number of times. For example, the emphasized feature map produced by hierarchical attention 220-1 is upsampled once, the emphasized feature map produced by hierarchical attention 220-2 is upsampled twice and the emphasized feature map produced by hierarchical attention 220-3 is upsampled three times.

The emphasized feature maps are upsampled to achieve a common scale (i.e. resolution), respectively, and are fed into spatial feature transformer 440 as the input of the squeeze reweight blocks 482, 484 and 486. These squeeze reweight blocks 482, 484 and 486 process and re-project the features of each point in the respective emphasized feature maps to eliminate null space for the features. Since the scales are also aligned, features in the re-projected feature maps can be point-wise added afterwards. The output of the squeeze reweight blocks 482, 484 and 486 are passed to attention blocks 488, 490 and 492 as skip connection outputs to linearly add features.

Next, decoder attention blocks 488, 490 and 492 perform a channel-wise voting operation to assign weights to each feature channel, producing weighted re-projected feature maps. Both the re-projected feature maps and the weighted re-projected feature maps are supplied to the sparse convolution block 494, which produces the fused feature map output of the spatial feature transformer 440 at the desired scale (i.e. resolution) for provision to the last decoder block of the decoder, such as decoder block 258 of FIG. 2. or decoder block 358 of FIG. 3.

Figure 6:
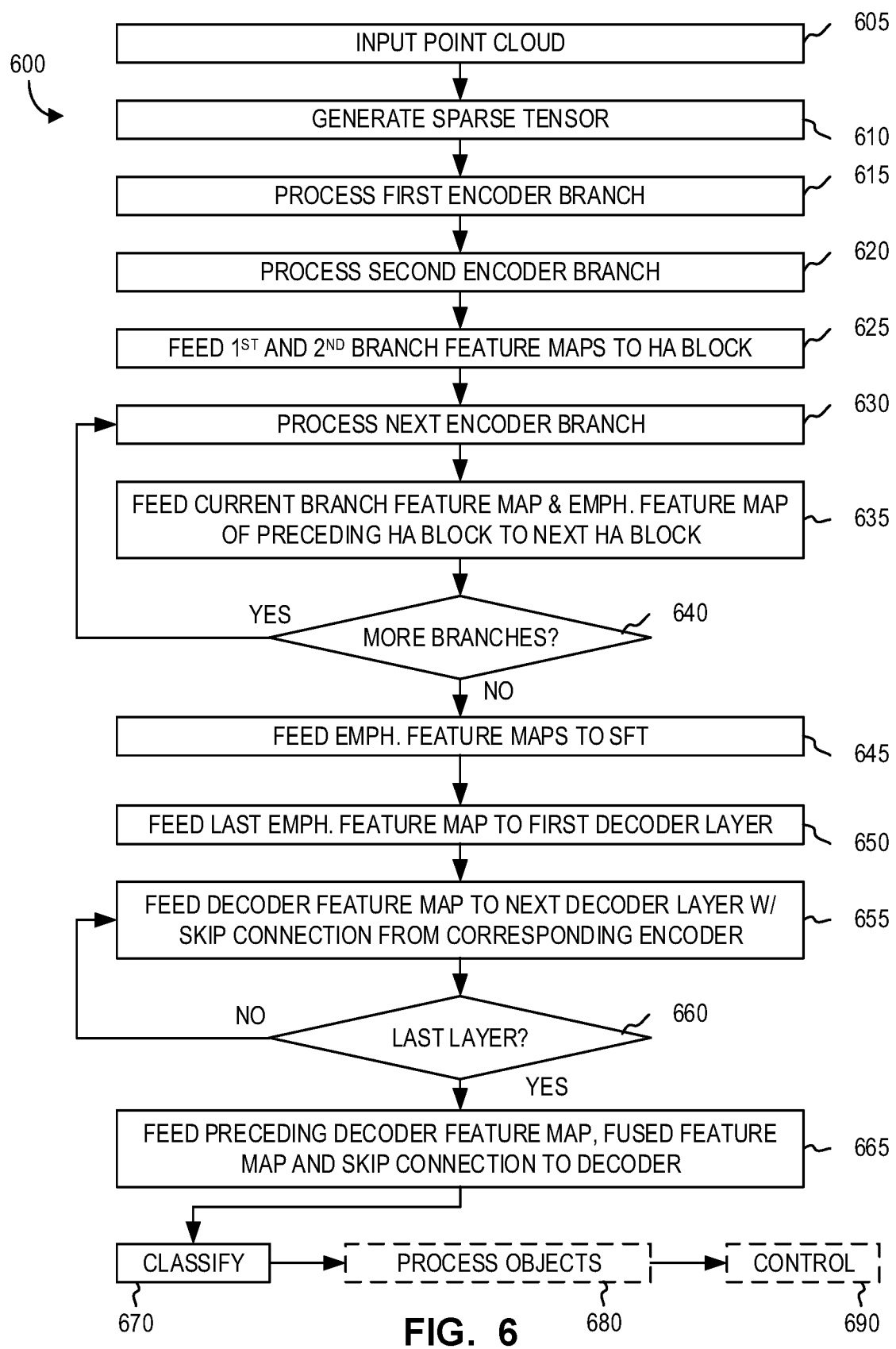
FIG. 6 is a flow chart diagram for a method of semantic segmentation of a 3D point cloud in accordance with examples disclosed herein.

Referring now to FIG. 6, there is illustrated a flow chart diagram for a method of semantic segmentation of a 3D point cloud, in accordance with at least some embodiments. Method 600 generally can be implemented by a computing apparatus, such as computer system 100 of FIG. 1.

Method 600 begins at 605, with the receiving and input of an unprocessed 3D point cloud by the computing apparatus as described elsewhere herein. For example, an unprocessed point 3D cloud may be generated by a LiDAR sensor.

At 610, the unprocessed 3D point cloud is pre-processed to generate a voxel-based representation (e.g., voxel data) with one or more features associated with each point in the voxelized point cloud, and produce a first sparse tensor with coordinate and feature information as described elsewhere herein. The first sparse tensor will generally have, for each point, a set of coordinates and one or more associated features that corresponds to the set of coordinates. Each set of coordinates may form a coordinate matrix as described, while the one or more associated features may be contained in a feature matrix as described.

The first sparse tensor is then fed to each of a plurality of branches of an encoder of the neural network, represented as encoder blocks 210-1 to 210-$n$ of neural network 200, as described elsewhere herein. The number of the plurality of branches numbers at least n, and each ith branch will generally have at least i sparse convolutional layers, to produce a plurality of branch feature maps corresponding to each branch. For instance, for branch i=1, there will be at least 1 sparse convolutional layer, for branch i=2, there will be at least 2 sparse convolutional layers, for branch i=3, there will be at least 3 sparse convolutional layers, and so forth.

The kernel size for each layer in the n encoding layers generally decreases with increasing depth. That is, generally the kernel will be largest for the first sparse convolutional layer and smallest for the final sparse convolutional layer in a branch. The kernel size may be determined, e.g., as described elsewhere herein.

At 615, the first sparse tensor is processed using a first encoder branch, such as branch p=1 of neural network 200, to produce a first branch feature map. The first encoder branch has the fewest sparse convolutional layers of the neural network as illustrated in FIG. 2, where the first branch of neural network 200 has one sparse convolutional layer represented by encoder block 210-1.

At 620, the first sparse tensor is processed using a second encoder branch, such as branch p=2 of neural network 200, to produce a second branch feature map. The second encoder branch has more sparse convolutional layers than the first encoder branch, as illustrated in FIG. 2, where the second branch of neural network 200 has two sparse convolutional layers represented by encoder blocks 210-2 and 212-2.

At 625, the first and second branch feature maps are processed using a hierarchical attention subnetwork, represented as hierarchical attention block 220-1 of neural network 200, to produce a first emphasized feature map. As described with reference to FIG. 4A, the first branch feature map is downsampled, linearly fused with the original second feature map, and undergoes a first sparse convolution operation, whereas the second branch feature map is upsampled, linearly fused with the original first feature map, and undergoes a second sparse convolution operation. That is, given a branch p, the (p−1)th and the pth branch feature maps are fed to the (p−1)th hierarchical attention block and used in both the first and second sparse convolution operations; however, the (p−1)th branch feature map is downsampled for use in the second sparse convolution operation, while the pth branch feature map is upsampled for use in the first sparse convolution operation. The results of both sparse convolution operations are then added, or fused, to produce the first emphasized feature map. As described herein, the number of hierarchical attention blocks will number at least (n−1) when there are n branches.

At 630, the first sparse tensor is processed using a next encoder branch, such as branch p=3 (or later) of neural network 200, to produce a next branch feature map. The next encoder branch has more sparse convolutional layers than the preceding encoder branch.

At 635, the next branch feature map and the emphasized feature map of the preceding branch are processed using a next hierarchical attention subnetwork, such as hierarchical attention block 220-2 (or later) of neural network 200, to produce a next emphasized feature map.

By feeding the plurality of feature maps to a plurality of hierarchical attention blocks in this way, the plurality of emphasized feature maps can be generated. Put another way, for every pth branch of the $2^{nd}$ and subsequent branches of the neural network, the pth branch feature map and the (p−1)th emphasized feature map are fed to a corresponding (p−1)th hierarchical attention block, whereas the first branch feature map is fed to the first hierarchical attention block. By way of example, when p=3, the third branch feature map and the second emphasized feature map are fed to a second hierarchical attention block; when p=4, the fourth branch feature map and the third emphasized feature map are fed to a third hierarchical attention block; and so forth.

At 640, a check is made whether there are any additional branches to process and, if yes, the processor returns to 630 to process the next branch. If there are no further branches to process, then at 645 the emphasized feature maps produced by the hierarchical attention blocks are processed using a spatial feature transformer, such as the spatial feature transformer 240 of neural network 200.

As described with reference to FIG. 4B, a shared decoder attention subnetwork, or spatial feature transformer, is used to process each of the emphasized feature maps generated at 635 by upsampling as necessary to scale them to a common scale, then applying additional attention operations to generate an output in the form of a fused feature map. The spatial feature transformer operations may also assign a weight to each of a plurality of channels, where the plurality of channels correspond to each emphasized feature map.

At 650, the emphasized feature map produced by the final hierarchical attention block operation and the fused feature map are processed in a first sparse deconvolutional layer operation, represented as decoder block 252 of neural network 200, to produce a first intermediate decoded feature map. As described herein, for a given number of branches n, the final hierarchical attention block is the (n−1)th hierarchical attention block. The first intermediate decoded feature map becomes the preceding intermediate decoded feature map for use by the next decoder block. Generally, there will be at least n sparse deconvolutional layers corresponding to n branches.

At 655, the preceding intermediate decoded feature map and the encoder-decoder skip connection from a corresponding encoder block at a common scale are decoded in a next layer sparse deconvolutional layer operation, represented as decoder blocks 254 and 256 of neural network 200, to produce subsequent intermediate decoded feature maps via sparse deconvolution operations. For a given number of branches n, there will be (n−1) encoder-decoder skip connection outputs to the n sparse deconvolutional layers from the first through (n−1)th sparse convolutional layers of the n encoder branches, with the (n−1) encoder-decoder skip connection outputs are fed to the n sparse deconvolutional layers by reverse order of respective depth. An example of this arrangement is shown in FIG. 2.

At 660, a check is made whether there are any additional sparse deconvolutional layers to process and, if yes, the processor returns to 655 to process the next layer and produce another intermediate decoded feature map. In this way, all intermediate sparse deconvolutional layers are processed up to the final decoder layer.

If only the final (nth) sparse deconvolutional layer remains, then at 665 the most recent intermediate (i.e., (n−1)th) decoder feature map, the fused feature map and the encoder-decoder skip connection from the first encoder layer are fused and processed in a final sparse deconvolutional layer operation, represented as decoder 258 of network 200, to produce a decoded feature map. The fusing involves a concatenation operation.

A classifier can be applied to the decoded feature map at 670 to perform a further sparse convolution operation to reduce the number of feature channels to the number of target classes (e.g., 20) and thereby generate a decoded sparse tensor with semantic class information or labels for each point. Put another way, the classifier processes the output of the last layer of the decoder, which itself is based on information from the spatial feature transformer, to predict a class label for each point in the 3D point cloud. In some cases, the resolution of the decoded sparse tensor may differ from the original, raw 3D point cloud or any feature maps internal to the neural network. In such cases, a voxel cell of the desired resolution may correspond to one or more points of the input point cloud. In such cases, all points inside a voxel cell may be assigned the same semantic class label.

Optionally, at 680, an object detection routine may be executed on the decoded sparse tensor to identify objects in the point cloud. Further optionally, at 685, the result of the object detection routine may be used to take a control action such as, for example, applying or modifying inputs or outputs to a control device.

It will be appreciated that although the operations of method 600 are described sequentially to aid understanding, many operations can be performed in parallel. For example, encoder operations that are not dependent on the output of a preceding operation can be initiated and performed in parallel. In some cases, some operations may begin even while awaiting the results of a preceding operation (e.g., a decoder layer operation may begin processing based on encoder-decoder skip connection input, when such processing does not depend on the preceding decoder layer data.

As described, embodiments provide a deep neural network for enhanced semantic segmentation of sparse 3D point clouds via a hierarchical attention mechanism and sparse feature fusion, which output a sparse tensor with classification labels or classes, which in turn can be used to enhance downstream perception tasks such as object detection, navigation, etc. In some variant embodiments, the output decoder (e.g., decoder 270 or 370) can be modified to a fully-connected regression layer to facilitate use of the decoder in an object detection neural network.

The described attention mechanisms serve to balance and aggregate information, which improves noise tolerance and increases the learning efficiency as well as generalizability.

As will be appreciated by the skilled reader, any combination of two or more of the exemplary neural networks described herein can be combined to form one or more embodiments of the semantic segmentation network for processing three-dimensional point clouds.

As previously noted, the steps of various aforementioned methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. As noted, the embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within the scope of the appended claims. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in FIG. 1, including the functional blocks labelled as "CPU" and "SPU", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative software and/or circuitry embodying the principles of the invention. Similarly, it will be appreciated that any flow charts, flow diagrams, state transition diagrams, pseudo code, and the like represent various processes which may be substantially represented in a non-transitory computer readable medium and so executed by a computer or processor whether or not such computer or processor is explicitly shown.

The invention claimed is:

1. A method for semantic segmentation of a 3D point cloud, the method comprising:
    processing a 3D point cloud to produce a sparse tensor;
    feeding the sparse tensor as an input to each of a plurality of branches of an encoder of a neural network to produce a plurality of branch feature maps, N being a number of the plurality of branches, N being equal to or greater than 3, each ith branch respectively comprising i sequentially chained different encoder blocks to produce an ith branch feature map, i being an integer between 1 and N;
    feeding the plurality of branch feature maps to a plurality of hierarchical attention blocks to generate a plurality of emphasized feature maps, wherein, for each pth branch of a 3rd to Nth branches, a pth branch feature map and a (p−2) th emphasized feature map are fed to a corresponding (p−1) th hierarchical attention block, the (p−2) th emphasized feature map is output by a (p−2) th hierarchical attention block, and wherein a first branch feature map and a second branch feature map are fed to a first hierarchical attention block;
    feeding each emphasized feature map output by the plurality of hierarchical attention blocks to a spatial feature transformer to fuse each emphasized feature map of the plurality of hierarchical attention blocks and generate a fused feature map; and
    processing the fused feature map and a final decoder block of a decoder to predict a class label for a plurality of points in the 3D point cloud.

2. The method of claim 1, wherein processing the 3D point cloud to produce the sparse tensor is obtained by pre-processing the 3D point cloud to generate a voxel representation of the 3D point cloud.

3. The method of claim 2, wherein the sparse tensor comprises for each point in the 3D point cloud, a set of coordinates and one or more associated features corresponding to the set of coordinates.

4. The method of claim 3, wherein each set of coordinates is contained within a coordinate matrix, wherein the one or more associated features are contained within a feature matrix.

5. The method of claim 1, further comprising, feeding an (N−1) th emphasized feature map output by an (N−1) th hierarchical attention block to a first decoder block.

6. The method of claim 5, wherein the first decoder block is first of N decoder blocks.

7. The method of claim 6, further comprising, feeding (N−1) encoder-decoder skip connection outputs from a first through (N−1) th encoder blocks of N encoder blocks to the N decoder blocks, wherein encoder-decoder skip connection outputs are fed to the N decoder blocks by reverse order of respective depth.

8. The method of claim 7, wherein processing the fused feature map comprises feeding the fused feature map to an nth decoder block.

9. The method of claim 8, further comprising fusing the fused feature map, an output of an (N−1) th decoder block and the output of first encoder blocks, wherein the fusing comprises concatenation followed by a convolution operation.

10. The method of claim 1, further comprising scaling each emphasized feature map output by the plurality of hierarchical attention blocks to a common scale, prior to obtaining the fused feature map.

11. The method of claim 1, further comprising assigning a weight to each of a plurality of channels, the plurality of channels corresponding to each output of the plurality of hierarchical attention blocks, prior to obtaining the fused feature map.

12. The method of claim 11, wherein a kernel size of each encoder block is given according to:

$$K = \left\lfloor \frac{N+2-p}{2^M} \right\rfloor + 3$$

wherein K is the kernel size, and M is block depth, and is a floor operation that rounds a value of $$\frac{N+2-p}{2^M}$$

to a nearest integer value.

13. The method of claim 1, wherein, for the first hierarchical attention block of the plurality of hierarchical attention blocks, the first hierarchical attention block comprises a first convolutional operation and a second convolutional operation.

14. The method of claim 13, wherein, when a (p−1) th branch feature map and the pth branch feature map are fed to the corresponding (p−1) th hierarchical attention block, the pth branch feature map is fed to the second convolutional operation.

15. The method of claim 14, wherein, when the (p−1) th branch feature map and the pth branch feature map are fed to the corresponding (p−1) th hierarchical attention block, the (p−1) th branch feature map is fed to the first convolutional operation.

16. The method of claim 15, wherein, when the (p−1) th branch feature map and the pth branch feature map are fed to the corresponding (p−1) th hierarchical attention block, the pth branch feature map is upsampled and fed to the first convolutional operation.

17. The method of claim 16, wherein, when the (p−1) th branch feature map and the pth branch feature map are fed to the corresponding (p−1) th hierarchical attention block, the (p−1) th branch feature map is downsampled and fed to the second convolutional operation.

18. The method of any one of claim 17, further comprising:
    adding a first output and a second output from the first convolutional operation and the second convolutional operation, respectively, to obtain an emphasized feature map from a hierarchical attention block.

19. An apparatus for semantic segmentation of a 3D point cloud, the apparatus comprising:
- a memory storing executable instructions for implementing a neural network; and
- at least one processor configured to execute the executable instructions to:
- process a 3D point cloud to produce a sparse tensor;
- feed the sparse tensor as an input to each of a plurality of branches of an encoder of the neural network to produce a plurality of branch feature maps, N being a number of the plurality of branches, N being equal to or greater than 3, each ith branch respectively comprising i sequentially chained different encoder blocks to produce an ith branch feature map, i being an integer between 1 and N;
- feed the plurality of branch feature maps to a plurality of hierarchical attention blocks to generate a plurality of emphasized feature maps, wherein, for each pth branch of a 3rd to Nth branches, a pth branch feature map and the a (p−2)th emphasized feature map are fed to a corresponding (p−1)th hierarchical attention block, the (p−2)th emphasized feature map is output by a (p−2)th hierarchical attention block, and wherein a first branch feature map and a second branch feature map are fed to a first hierarchical attention block;
- feed each emphasized feature map output by the plurality of hierarchical attention blocks to a spatial feature transformer to fuse each emphasized feature map of the plurality of hierarchical attention blocks and generate a fused feature map; and
- process the fused feature map and a final decoder block to predict a label for a plurality of points in the 3D point cloud.

20. A non-transitory computer readable medium storing executable instructions which, when executed by a computer, cause at least one processor of the computer to:
- process a 3D point cloud to produce a first sparse tensor;
- feed the first sparse tensor as an input to each of a plurality of branches of an encoder of a neural network to produce a plurality of branch feature maps, N being a number of the plurality of branches, N being equal to or greater than 3, each ith branch respectively comprising i sequentially chained different encoder blocks to an ith branch feature map, i being an integer between 1 and N;
- feed the plurality of branch feature maps to a plurality of hierarchical attention blocks to generate a plurality of emphasized feature maps, wherein, for each pth branch of a 3rd to Nth branches, a pth branch feature map and a (p−2)th emphasized feature map are fed to a corresponding (p−1)th hierarchical attention block, the (p−2)th emphasized feature map is output by a (p−2)th hierarchical attention block, and wherein a first branch feature map and a second branch feature map are fed to a first hierarchical attention block;
- feed each emphasized feature map output by the plurality of hierarchical attention blocks to a spatial feature transformer to fuse each emphasized feature map of the plurality of hierarchical attention blocks and generate a fused feature map; and
- process the fused feature map and a final decoder block to predict a label for a plurality of points in the 3D point cloud.

* * * * *